(12) United States Patent
Shiuan

(10) Patent No.: US 6,345,510 B1
(45) Date of Patent: Feb. 12, 2002

(54) AIR-CONDITIONING SYSTEM

(76) Inventor: Joackim Shiuan, 5F., No. 13, Alley 54, Lane 2, Sec. 2, Yan Jiu Yuan Rd., Taipei (TW)

( * ) Notice: Subject to any disclaimer, the term of this patent is extended or adjusted under 35 U.S.C. 154(b) by 0 days.

(21) Appl. No.: 09/717,122

(22) Filed: Nov. 22, 2000

(51) Int. Cl.[7] .............................. F24F 3/16; F25D 17/04
(52) U.S. Cl. ............................................. 62/78; 62/317
(58) Field of Search ............................ 62/78, 264, 317

(56) References Cited

U.S. PATENT DOCUMENTS

| | | | | |
|---|---|---|---|---|
| 4,990,313 A | * | 2/1991 | Pacosz | 422/121 |
| 5,428,964 A | * | 7/1995 | Lobdell | 62/176.6 |
| 5,798,455 A | * | 8/1998 | Sakata et al. | 73/64.48 |
| 5,816,315 A | * | 10/1998 | Stark | 165/66 |
| 5,890,367 A | * | 4/1999 | You et al. | 62/78 |
| 5,909,767 A | * | 6/1999 | Batt | 165/166 |
| 5,913,360 A | * | 6/1999 | Stark | 165/66 |
| 5,931,016 A | * | 8/1999 | Yoho | 62/271 |

\* cited by examiner

*Primary Examiner*—William C. Doerrler
(74) *Attorney, Agent, or Firm*—Bacon & Thomas, PLLC

(57) ABSTRACT

An air-conditioning system is constructed to include a full-heat heat exchanger, the full-heat heat exchanger having a first inlet and a second inlet arranged at right angles, a first air filter unit connected to the first inlet of the full-heat heat exchanger and adapted to filter air passing through the first inlet of the full-heat heat exchanger, the first air filter unit being formed of a primary coarse particle wire gauze filter, a HEPA (high efficiency particulate air filter) core, an active carbon coated wire gauze filter, and an optical catalytic wheel, and first fan means disposed in front of the full-heat heat exchanger and adapted to draw outside air into the first air filter unit.

9 Claims, 6 Drawing Sheets

AIR-CONDITIONING SYSTEM

BACKGROUND OF THE INVENTION

The present invention relates to an air-conditioning system and, more particularly, to such an air-conditioning system, which uses first air filter means to remove solid matter from air passing to the inside of the house and simultaneously to destroy bad smells, heat-exchanger means to reduce the temperature of filtered air being delivered to the inside of the house, and second air filter means to filter exhaust air.

Air-conditioning systems with full-heat heat exchanger means are well known, and have been intensively used for the advantage of energy saving. Further, a variety of filter means have been disclosed for use to purity air. It is desirable to provide an air-conditioning system with multi-function air filter means.

SUMMARY OF THE INVENTION

According to one aspect of the present invention, the air-conditioning system comprises a full-heat heat exchanger, the full-heat heat exchanger having a first inlet and a second inlet arranged at right angles, a first air filter unit connected to the first inlet of the full-heat heat exchanger and adapted to filter air passing through the first inlet of the full-heat heat exchanger, the first air filter unit being formed of a primary coarse particle wire gauze filter, a HEPA (high efficiency particulate air filter) core, an active carbon coated wire gauze filter, and an optical catalytic wheel, and first fan means disposed in front of the full-heat heat exchanger and adapted to draw outside air into the first air filter unit. According to another aspect of the present invention, the air-conditioning system further comprises a second air filter unit disposed in front of or behind the second inlet of the full-heat heat exchanger and adapted to filter air passing through the full-heat heat exchanger, and second fan means adapted to draw off air from the second air filter unit. According to still another aspect of the present invention, the optical catalytic wheel comprises a bearing rack, a wheel body revolvably supported in said bearing rack, and a coating of optical catalyst sintered on said wheel body. The wheel body is made of glass or ceramic material that resists heat over 250° C.

DETAILED DESCRIPTION OF THE PREFERRED EMBODIMENT

Figure 1:
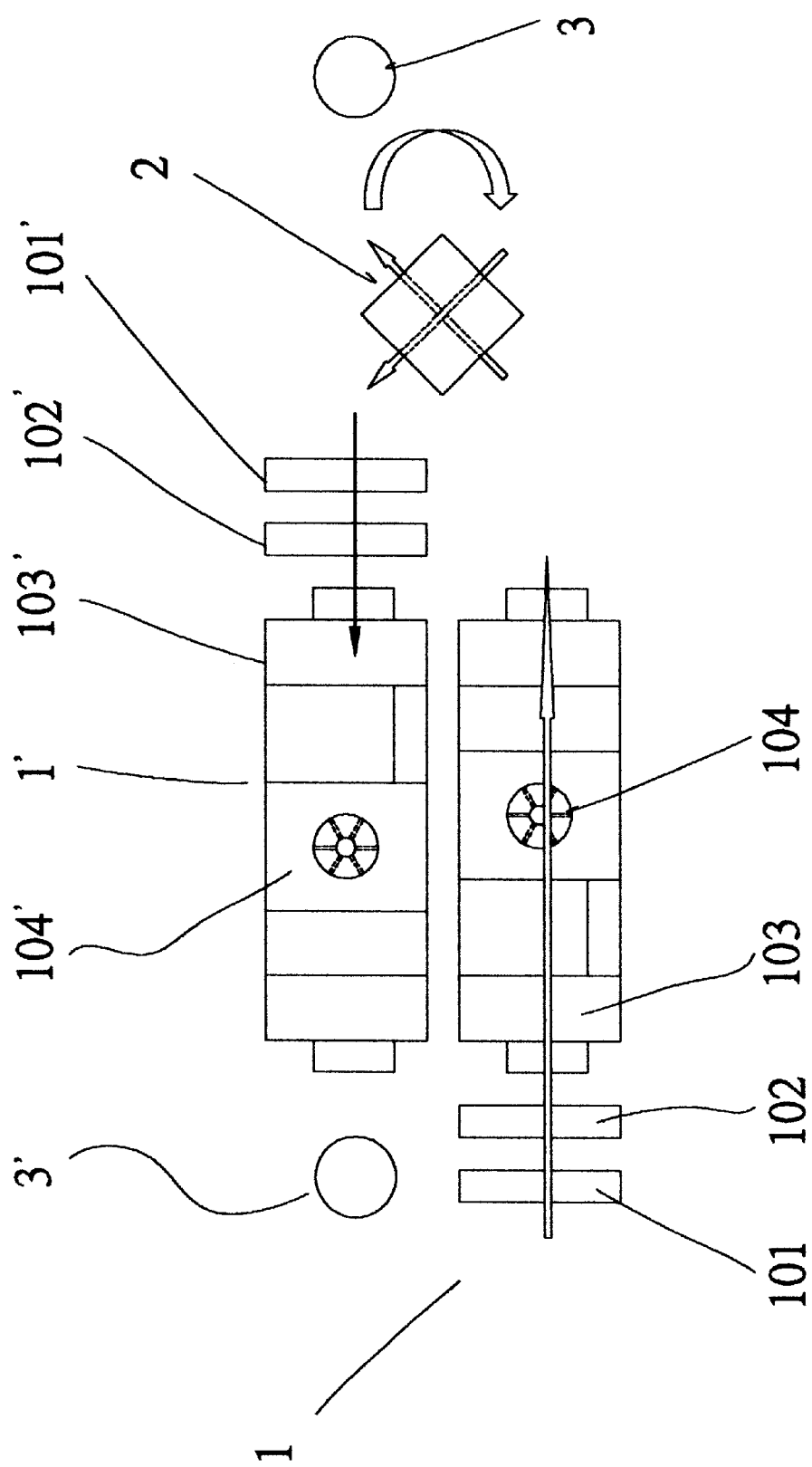
FIG. 1 is a schematic drawing showing the arrangement of an air-conditioning system according to the present invention.
Figure 4:
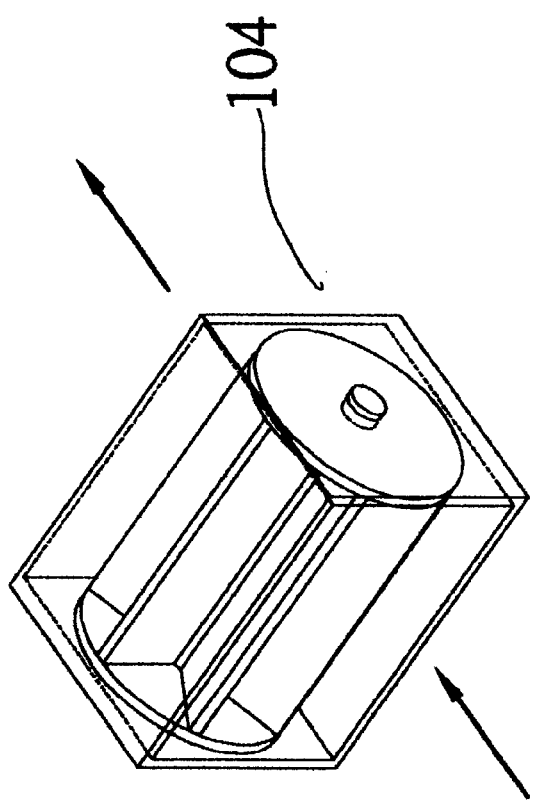
FIG. 4 is a perspective view of an optical catalytic wheel constructed according to the present invention.

Referring to FIG. 1, and air-conditioning system in accordance with the present invention is generally comprised of an air filter unit 1, a full-heat heat exchanger 2, and a fan 3. The heat exchanger 2 is a device for transferring the heat of one substance to another, in this case, heat is transferred to or from the filtered air, via a cooling device (not shown). The air filter 1 comprises a primary wire gauze filter 101, a HEPA (high efficiency particulate air filter) core 102, an active carbon coated wire gauze filter 03, and an optical catalytic wheel 104. The primary coarse particle wire gauze filter 101 can be washable or disposable. The HEPA core 102 is made of fibers by weaving, and adapted to absorb microbes and particles of diameter as small as 0.3 nm, to remove smoke, volatile organic and any of a variety of gases, and to destroy bad smells. The active carbon coated wire gauze filter 103 absorbs gas, dust and bad smells from the currents of air passing through. The optical catalytic wheel 104 (see FIG. 4) is coated with a layer of optical catalyst, which is activated to condense the proteins of viruses and to decompose vehicle waste gas. If required, a humidifier or heater may be installed in the air filter unit 1.

Figure 6:
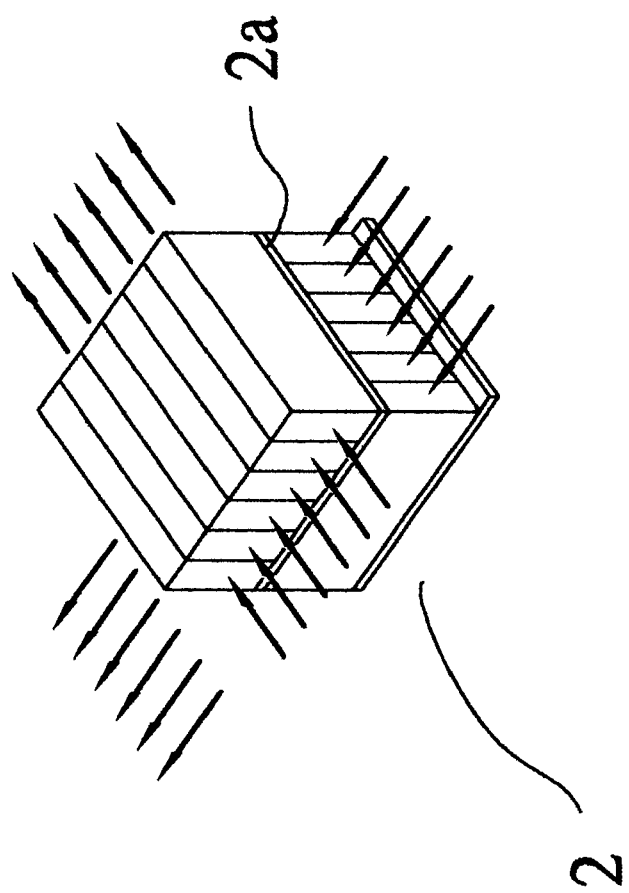
FIG. 6 is a schematic drawing showing currents of air passed through the first inlet and second inlet of the full-heat heat exchanger according to the present invention.

Referring to FIG. 6 and FIG. 1 again, the fan 3 is provided in front of the heat exchanger 2, and adapted to draw outside air to the air filter unit 1. The full-heat heat exchanger 2 comprises a layer heat exchanging paper 2a. After had been filtered through the air filter unit 1, purified air is guided through a first inlet of the full-heat heat exchanger 2. When passing over the layer of heat exchaging paper 2a of the full-heat heat exchanger 2, the temperature of purified air is reduced by means of a heat exchanging action, and then the initially cooled down currents of purified air are guided into the inlet of a conventional air cooler, so that the air cooler outputs cold currents of purified air into the house. Please refer to FIGS. 1 and 6 again, indoor cold air flows through the second inlet of the full-heat heat exchanger 2 to make a heat exchanging action. The first inlet and second inlet of the full-heat heat exchanger 2 are arranged at right angles. After passing through the full-heat heat exchanger 2, indoor cold air is guided to a second air filter unit 1', which is comprised of a primary wire gauze filter 101', a HEPA (high efficiency particulate air filter) core 102', an active carbon coated wire gauze filter 103', and an optical catalytic wheel 104'. A second fan 3' is provided in front of the second air filter unit 1' for exhaust of air from the second air filter unit 1' to the outside of the house. Therefore, exhaust of air is purified air that can be guided to the first air filter unit 1 for further circulation through the house. This arrangement keeps indoor air in a purified condition, and saves much energy.

Figure 2:
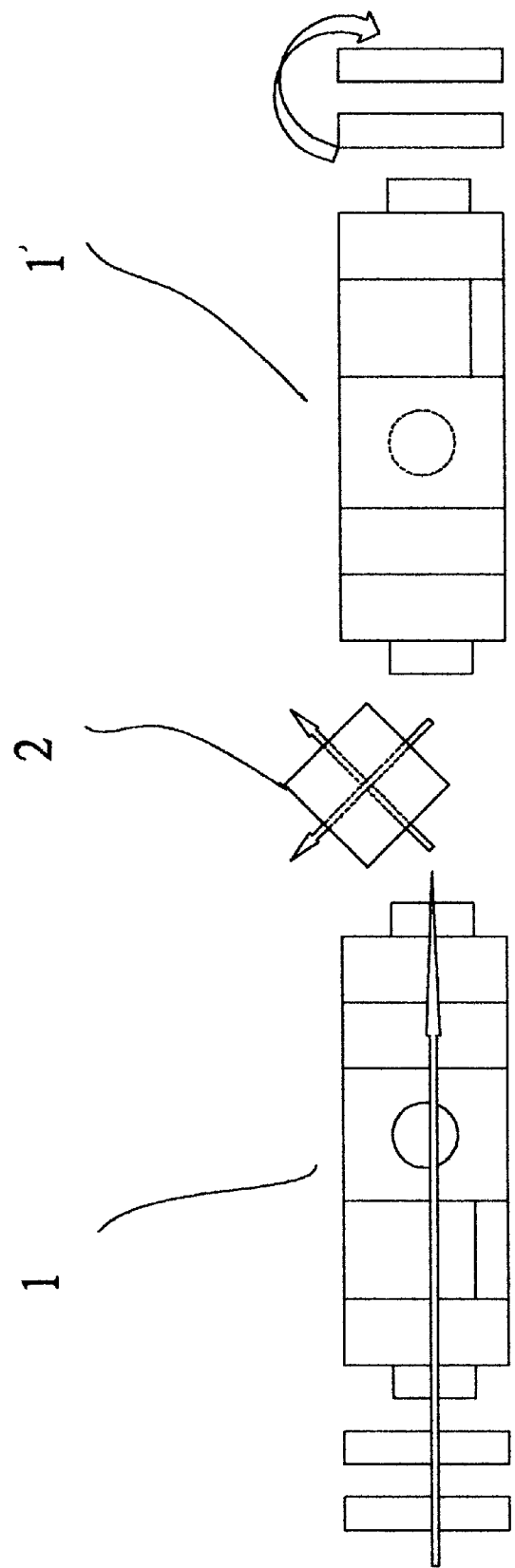
FIG. 2 is a schematic drawing showing the arrangement of an alternate form of the air-conditioning system according to the present invention.

FIG. 2 shows another example of arrangement of the two air purifier units 1 and 1'. According to this arrangement, the second air filter unit 1' is disposed in front of the second inlet of the full-heat heat exchanger 2 (unlike the arrangement shown in FIG. 1 in which the second air filter unit 1' is disposed behind the full-heat heat exchanger 2).

Figures 3A, 3B, 3C, 3D:
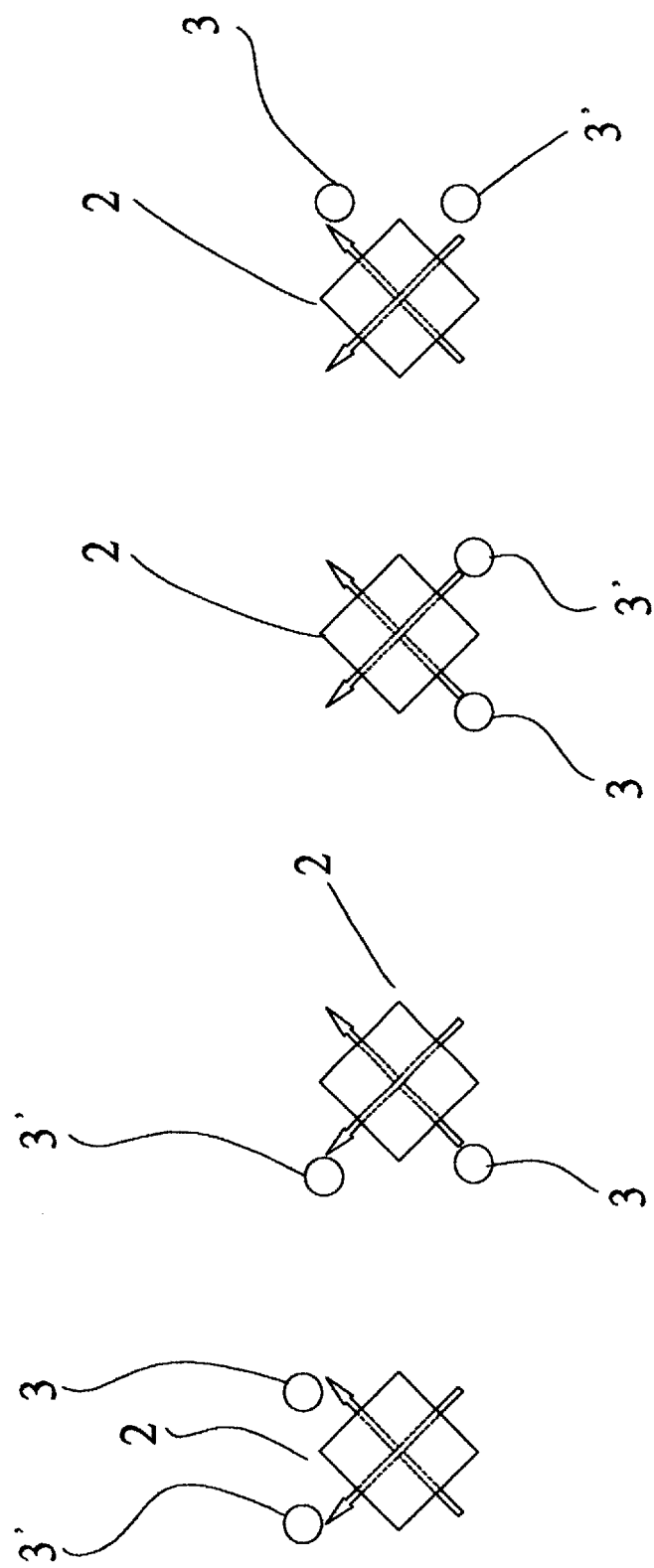
FIGS. 3a~3d illustrate different alternate forms of the arrangement of the fans relative to the full-heat heat exchanger.

FIGS. from 3a through 3d show different arrangement of the two fans 3 and 3' relative to the full-heat heat exchanger 2. In FIG. 3a, the fans 3 and 3' are both disposed in front of the full-heat heat exchanger 2; in FIG. 3b, the first fan 3 is disposed behind the full-heat heat exchanger 2, and the second fan 3' is disposed in front of the full-heat heat exchanger 2; in FIG. 3c, the two fans 3 and 3' are both disposed behind the full-heat heat exchanger 2; in FIG. 3d, the first fan 3 is disposed in front of the full-heat heat exchanger 2, and the second fan 3' is disposed behind the full-heat heat exchanger 2.

Figure 5:
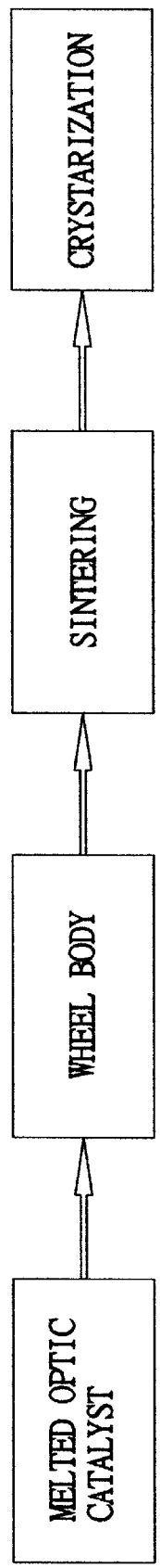
FIG. 5 is a block diagram showing the fabrication of the optical catalytic wheel according to the present invention.

Referring to FIG. 5, the aforesaid optical catalytic wheel is comprised of a wheel body made of glass or ceramic material, and a layer of optical catalyst covered on the outer surface of the wheel body. Melted optical catalyst is covered on the outer surface of the wheel body by rotary coating or dipping, and then the optical catalyst coating is sintered into a crystal-like layer of coating at the outer surface of the wheel body. The optical catalyst coated wheel body is then revolvably supported on a bearing rack. When currents of air passing through the optical catalytic wheel 104, the wheel body is rotated in the rack.

It is to be understood that the drawings are designed for purposes of illustration only, and are not intended for use as a definition of the limits and scope of the invention disclosed.

What the invention claimed is:

1. An air-conditioning system comprising:
   a full-heat heat exchanger for cooling air, the full-heat exchanger comprising a cooling device, said full-heat heat exchanger having a first inlet and a second inlet arranged at right angles;
   a first air filter unit connected to the first inlet of said full-heat heat exchanger and adapted to filter air passing through the first inlet of said full-heat heat exchanger, said first air filter unit comprising a primary coarse particle wire gauze filter, a HEPA (high efficiency particulate air filter) core, an active carbon coated wire gauze filter, and an optical catalytic wheel; and
   first fan means disposed in front of said full-heat heat exchanger and adapted to draw outside air into said first air filter unit.

2. The air-conditioning system of claim 1 further comprising a second air filter unit disposed in front of the second inlet of said full-heat heat exchanger and adapted to filter air passing through the second inlet of said full-heat heat exchanger, and second fan means adapted to draw off air from said second air filter unit.

3. The air-conditioning system of claim 1 further comprising a second air filter unit disposed behind the second inlet of said full-heat heat exchanger and adapted to filter air passing through the second inlet of said full-heat heat exchanger, and second fan means adapted to draw off air from said second air filter unit.

4. The air-conditioning system of claim 2, wherein said first fan means and said second fan means are selectively installed in front/behind the inlets of said full-heat heat exchanger.

5. The air-conditioning system of claim 3, wherein said first fan means and said second fan means are selectively installed in front/behind the inlets of said full-heat heat exchanger.

6. The air-conditioning system of claim 1 further comprising ultraviolet lamp means adapted to emit ultraviolet light toward said optical catalytic wheel.

7. The air-conditioning system of claim 1, wherein said optical catalytic wheel comprises a bearing rack, a wheel body selectively made of glass or ceramic material and revolvably supported in said bearing rack, and the coating of optical catalyst is sintered on said wheel body.

8. An air-conditioning system as claimed in claim 1, wherein the optical catalytic wheel comprises a coating of optical catalyst that condenses proteins and decomposes impurities in air passed through the optical catalytic wheel.

9. An air-conditioning system as claimed in claim 1, wherein the primary coarse wire gauze filter, the HEPA filter and the carbon coated wire gauge filter are arranged in a series such that relatively large-sized impurities of filtered air are initially collected by the primary coarse wire gauge filter, the relatively medium-sized impurities of filtered air are collected by the HEPA filter, and then relatively smaller impurities of filtered air are collected by the carbon coated wire gauge filter, after which air filtered by the carbon coated wire gauze is treated by the optical catalytic wheel.

* * * * *